(12) United States Patent
Dai (10) Patent No.: US 10,718,853 B2
(45) Date of Patent: Jul. 21, 2020

(54) ENVIRONMENTAL CONTROL SYSTEM, CONTROL APPARATUS, AND CONTROL METHOD

(71) Applicant: HTC CORPORATION, Taoyuan (TW)

(72) Inventor: Chen-Si Dai, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 422 days.

(21) Appl. No.: 15/787,089

(22) Filed: Oct. 18, 2017

(65) Prior Publication Data

US 2018/0313937 A1 Nov. 1, 2018

Related U.S. Application Data

(60) Provisional application No. 62/409,386, filed on Oct. 18, 2016.

(51) Int. Cl.
| | | |
|---|---|---|
| *G01S 7/481* | (2006.01) | |
| *G01S 17/42* | (2006.01) | |
| *G06F 3/01* | (2006.01) | |
| *G01S 1/70* | (2006.01) | |
| *G01S 5/16* | (2006.01) | |

(52) U.S. Cl.
CPC .............. *G01S 7/4811* (2013.01); *G01S 1/70* (2013.01); *G01S 5/16* (2013.01); *G01S 17/42* (2013.01); *G06F 3/011* (2013.01)

(58) Field of Classification Search
CPC ... G01S 1/70; G01S 5/16; G01S 17/42; G01S 7/4811; G06F 3/011
USPC .......................................................... 356/4.01
See application file for complete search history.

(56) References Cited

U.S. PATENT DOCUMENTS

2017/0274281 A1* 9/2017 Vandonkelaar ......... G06T 7/246

FOREIGN PATENT DOCUMENTS

| CN | 101998628 A | 3/2011 |
|---|---|---|
| CN | 103582091 A | 2/2014 |

OTHER PUBLICATIONS

SIPO First Office Action corresponding to Application No. 201710972694.9; dated Dec. 3, 2019.
TIPO First Office Action corresponding to Application No. 106135695; dated Dec. 26, 2018.

\* cited by examiner

*Primary Examiner* — Daniel L Murphy
(74) *Attorney, Agent, or Firm* — Cantor Colburn LLP (57) ABSTRACT

An environmental control system, control apparatus, and control method thereof are provided. The control apparatus receives a plurality of sets of sensed signals from a trackable apparatus, wherein each set of sensed signals is sensed from one of a primary base station and a first secondary base station and the last set of sensed signals is sensed from the primary base station. The primary base station, the first secondary base station, and a second secondary base station have a common coverage area. The control apparatus determines that the trackable apparatus has moved at least a predetermined distance in the common coverage area in a direction away from the first secondary base station and toward the second secondary base station. In responses to the determination, the control apparatus transmits instruction signals to turn off the first secondary base station and turn on the second secondary base station.

21 Claims, 5 Drawing Sheets

ENVIRONMENTAL CONTROL SYSTEM, CONTROL APPARATUS, AND CONTROL METHOD

CROSS-REFERENCES TO RELATED APPLICATIONS

This application claims the benefit of U.S. Provisional Application Ser. No. 62/409,386 filed on Oct. 18, 2016, which is hereby incorporated by reference in its entirety.

BACKGROUND OF THE INVENTION

The present invention relates to an environmental control system, a control apparatus, and a control method thereof. More particularly, the present invention relates to an environmental control system, a control apparatus, and a control method thereof that adopt a lighthouse tracking technology.

DESCRIPTION OF THE RELATED ART

In the Virtual Reality (VR) technology, determining and tracking a position of a user rapidly and correctly in order to simulate the position in a three-dimensional virtual environment is an important task.

A virtual reality tracking technology that has been brought to people's attention is the lighthouse tracking technology, which tracks the position of a trackable apparatus worn by the user (e.g., a Head-Mounted Display (HMD)) by two base stations (one is a primary base station, and the other is a secondary base station that is synchronous with the primary base station). Briefly speaking, the two base stations operate in turns, each base station transmits a synchronous signal and then scans the actual space with a signal (e.g., a laser beam) in its sweep cycle. The trackable apparatus senses the signal transmitted by the base stations by a plurality of sensors comprised in the trackable apparatus. A host at the back end calculates the position of the trackable apparatus in the actual space according to the signal sensed by the trackable apparatus, and then simulates the position in the three-dimensional virtual environment.

Although the lighthouse tracking technology achieves high accuracy in tracking and positioning, the moving space of the user is limited by the distance and the angle of the signals transmitted by the base station. Accordingly, it is an important issue to extend the range that can be traced by the lighthouse tracking technology.

SUMMARY OF THE INVENTION

An objective of the present invention is to provide a control apparatus. The control apparatus comprises a receiving interface and a processor, which are electrically connected with each other. The receiving interface is configured to receive a plurality of sets of sensed signals from a trackable apparatus within a time period, wherein each set of sensed signals is sensed from one of a primary base station and a first secondary base station, and the last set of sensed signals is sensed from the primary base station. The primary base station, the first secondary base station, and a second secondary base station have a common coverage area. The processor is configured to determine that the trackable apparatus has moved at least a predetermined distance in the common coverage area in a direction away from the first secondary base station and toward the second secondary base station within the time period according to the sets of sensed signals. After the processor determines that the trackable apparatus has moved at least the predetermined distance in the common coverage area in the direction within the time period, the receiving interface further transmits a first instruction signal to turn off the first secondary base station and transmits a second instruction signal to turn on the second secondary base station.

Another objective of the present invention is to provide an environmental control system, which comprises a primary base station, a first secondary base station, a second secondary base station, and a control apparatus described in the above paragraph.

Yet another objective of the present invention is to provide a control method, which is adapted for an electronic computing apparatus. The control method comprises the following steps: (a) receiving a plurality of sets of sensed signals from a trackable apparatus within a time period, wherein each set of sensed signals is sensed from one of a primary base station and a first secondary base station, the last set of sensed signals is sensed from the primary base station, and the primary base station, the first secondary base station, and a second secondary base station have a common coverage area, (b) determining that the trackable apparatus has moved at least a predetermined distance in the common coverage area in a direction away from the first secondary base station and toward the second secondary base station within the time period according to the sets of sensed signals, (c) transmitting a first instruction signal to turn off the first secondary base station after determining that the trackable apparatus has moved at least the predetermined distance in the common coverage area in the direction within the time period, and (d) transmitting a second instruction signal to turn on the second secondary base station after determining that the trackable apparatus has moved at least the predetermined distance in the common coverage area in the direction within the time period.

The control technology (including the environmental control system, the control apparatus, and the control method thereof) provided by the present invention may be used with the lighthouse tracking technology. The present invention decides whether to switch the secondary base station in operation or the primary base station in operation according to which common coverage area of the base stations where the trackable apparatus is in and whether the trackable apparatus faces the primary base station. Through the control technology provided by the present invention, only one primary base station and one secondary base station operate at any time point and, thereby, the problem of a limited working/moving space in the conventional lighthouse tracking technology can be solved.

The detailed technology and preferred embodiments implemented for the subject invention are described in the following paragraphs accompanying the appended drawings for people skilled in the art to well appreciate the technical features of the claimed invention.

DESCRIPTION OF THE PREFERRED EMBODIMENT

As mentioned, the lighthouse tracking technology is capable of providing high-accurate positioning and, therefore, how to extend its tracking range is an important issue. According to the lighthouse tracking technology, a trackable apparatus cannot receive signals from two secondary base stations at the same time. Hence, when extending the tracking range of the lighthouse tracking technology by increasing the number of secondary base stations, a technical problem to be solved is how to switch between secondary base stations.

The following embodiments will describe how an environmental control system, a control apparatus, and a control method thereof provided in the present invention switch between different secondary base stations so that only one secondary base station operates with a primary base station at any time point. However, these embodiments are not intended to limit the present invention to any environment, applications, or implementations described in these embodiments. Therefore, description of these embodiments is only for purpose of illustration rather than to limit the scope of the present invention. It shall be appreciated that, in the following embodiments and the attached drawings, elements unrelated to the present invention are omitted from depiction. In addition, dimensions of elements and dimensional relationships among individual elements in the attached drawings are only for the purpose of illustration, not to limit the scope of the present invention.

Figure 1A:
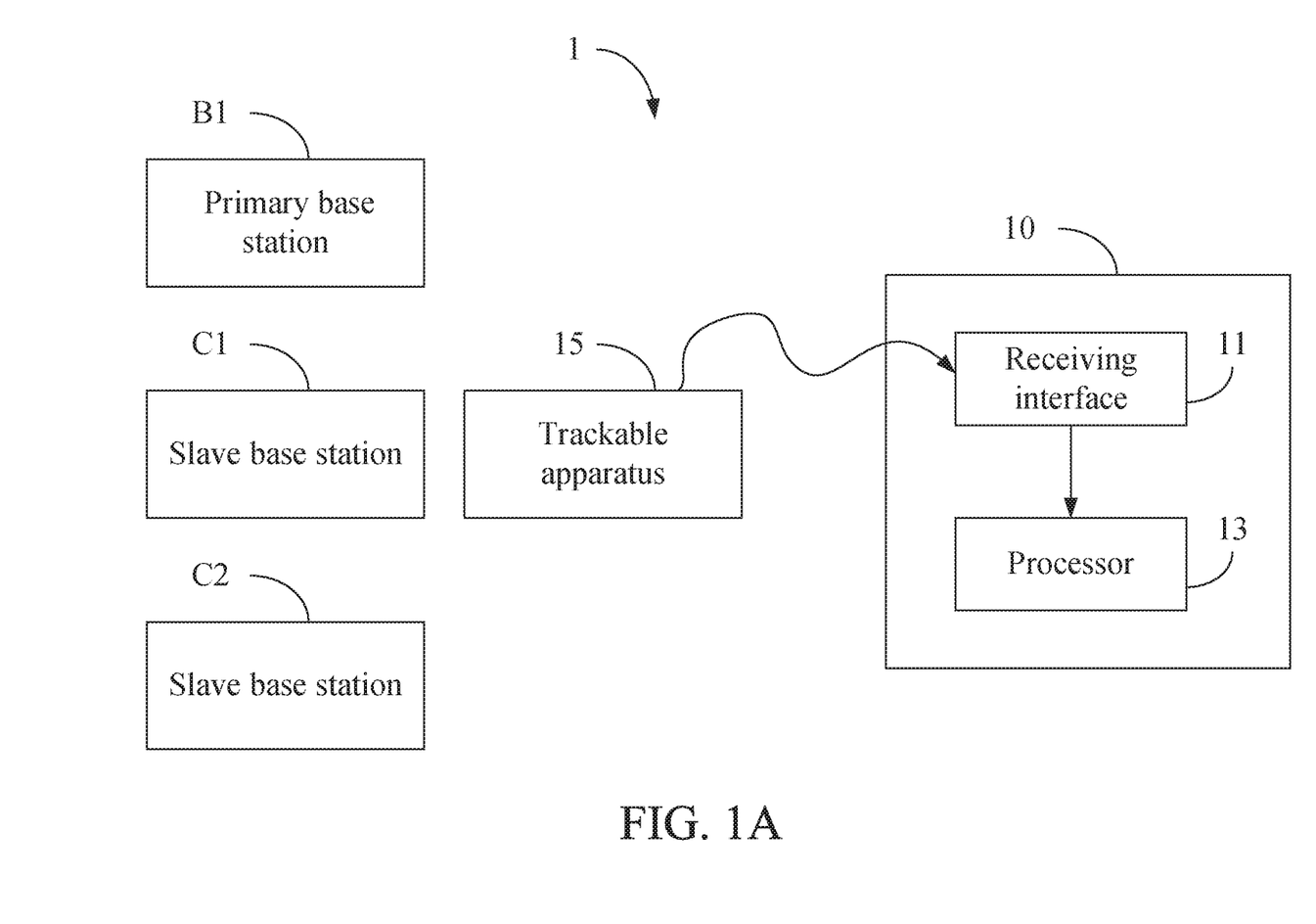
FIG. 1A is a schematic view depicting an environment control system 1 according to a first embodiment.

A first embodiment of the present invention is an environmental control system 1, and a schematic view thereof is depicted in FIG. 1A. The environmental control system 1 comprises a control apparatus 10, a trackable apparatus 15, a primary base station B1, and two secondary base stations C1 and C2. The control apparatus 10 comprises a receiving interface 11 and a processor 13, which are electrically connected with each other. The receiving interface 11 may be any apparatus that is capable of receiving signals and data. The processor 13 may be any processor, central processing units (CPUs), microprocessors, or other computing devices well known to those of ordinary skill in the art. In this embodiment, each of the control apparatus 10 and the trackable apparatus 15 is an independent hardware. However, in other embodiments, the control apparatus 10 and the trackable apparatus 15 may be integrated into one hardware.

Each of the primary base station B1 and the secondary base stations C1 and C2 may be an apparatus capable of transmitting a synchronous signal and then scan a space with a signal (e.g., a laser beam) within its own sweep cycle, wherein the sweep cycles of the primary base station B1 and the secondary base stations C1 and C2 are not overlapped. For example, the structures of the primary base station B1 and the secondary base stations C1 and C2 may be the same as the structures of the base stations used in the conventional lighthouse tracking technology. Nevertheless, turning on and off of the secondary base stations C1 and C2 are controlled by the control apparatus 10 of the present invention.

The trackable apparatus 15 comprises a plurality of sensors (e.g., optical sensors) for sensing signals transmitted by the primary base station B1 and the secondary base stations C1 and C2. For example, the trackable apparatus 15 may be a head-mounted display. In each sweep cycle, the sensors comprised in the trackable apparatus 15 perform sensing operation. In each sweep cycle, it is possible that all the sensors have sensed the signal, only some of the sensors has/have sensed the signal, or none of the sensors has sensed the signal depending on the position of the trackable apparatus 15. The trackable apparatus 15 integrates signals sensed in each sweep cycle into a set of sensed signals. In other words, in this embodiment, each set of sensed signals comprises at least one sensed value, and each of the at least one sensed value is sensed from one of the sensors of the trackable apparatus 15. If a set of sensed signals comprises N sensed values, it means that N sensors have sensed the signal in a sweep cycle, wherein N is a positive integer.

Figure 1B:
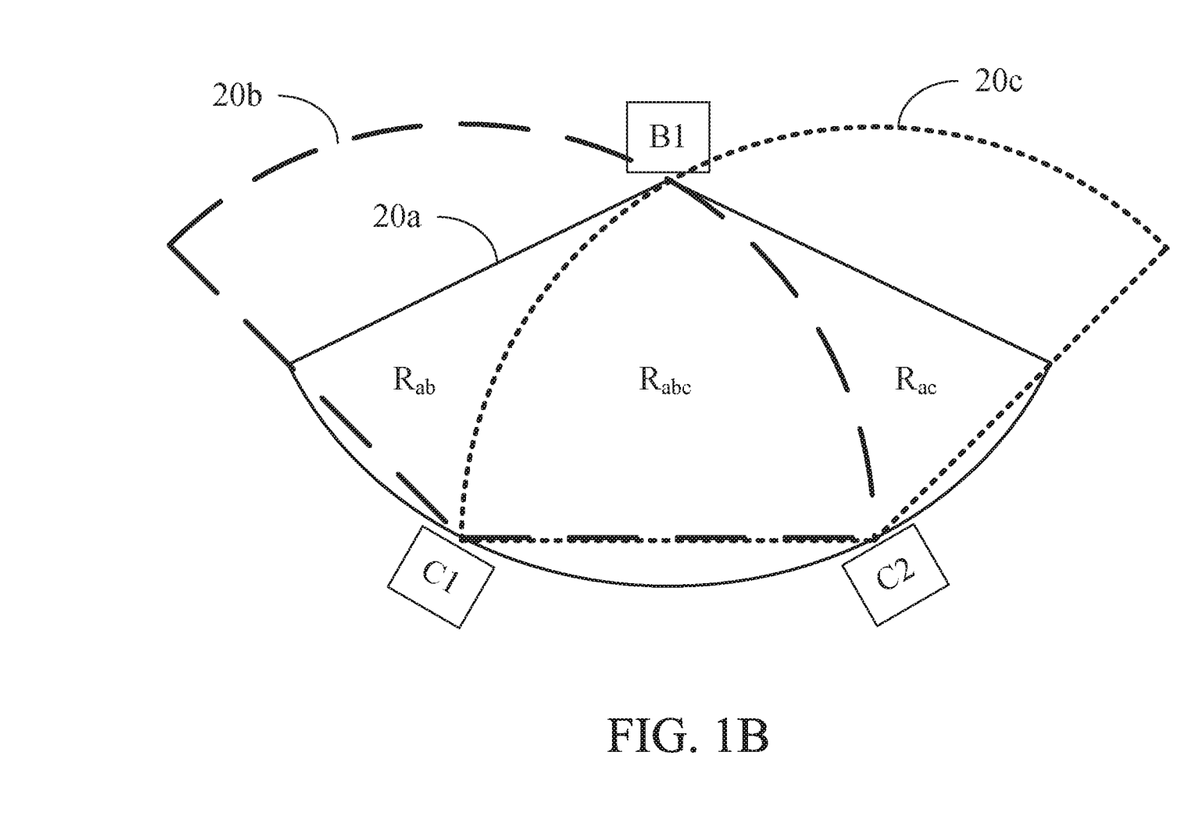
FIG. 1B is a top view of a specific example in which a primary base station B1 and slave base stations C1 and C2 are disposed.

Before the operation of the environmental control system 1, the primary base station B1 and the secondary base stations C1 and C2 have to be disposed in a space. FIG. 1B is a top view depicting a specific example in which the primary base station B1 and the secondary base stations C1 and C2 are disposed in a space. However, this specific example is not intended to limit the scope of the present invention. The control apparatus 10 will know the locations where the primary base station B1 and the secondary base stations C1 and C2 are disposed (e.g., in an initialization stage).

Please refer to FIG. 1B. Based on the distances and the angles of the transmitted signals, the primary base station B1 and the secondary base stations C1 and C2 respectively define the coverage areas 20a, 20b, and 20c. The primary base station B1 and the secondary base stations C1 and C2 has a common coverage area $R_{abc}$ (i.e., the intersection of the coverage areas 20a, 20b, and 20c). Moreover, a common coverage area $R_{ab}$ is an area covered only by the primary base station B1 and the secondary base station C1, and a common coverage area $R_{ac}$ is an area covered only by the primary base station B1 and the secondary base station C2. The control apparatus 10 will know the common coverage areas $R_{abc}$, $R_{ab}$, and $R_{ac}$ (e.g., in an initialization stage).

During the operation of the environmental control system 1, the trackable apparatus 15 has to be connected to the control apparatus 10 (in a wired or wireless way). When the environmental control system 1 operates, the trackable apparatus 15 may move in the space (e.g., a user wears the trackable apparatus 15 and moves in the space) and transmit a set of sensed signals sensed from the primary base station B1, the secondary base station C1, or the secondary base station C2 to the control apparatus 10. Please note that at any time point during the operation of the environmental control system 1, the primary base station B1 is always turned on, but only one of the secondary base stations C1 and C2 is turned on. After receiving the set of sensed signals transmitted from the trackable apparatus 15, the control apparatus 10 calculates the location of the trackable apparatus 15 in the space and determines whether to switch the secondary base station in operation (i.e., turn off the secondary base station that is in operation currently and turn on another secondary base station). Since the present invention focuses on how to decide the switching of the secondary base stations (which can also be referred to as handover), the following description will focus on this portion with reference to the specific example shown in FIG. 1B.

As described above, at any time point during the operation of the environmental control system 1, the primary base station B1 is always turned on, but only one of the secondary base stations C1 and C2 is turned on. Therefore, when the trackable apparatus 15 is in the common coverage area $R_{abc}$, there is a need in considering whether to switch the secondary base station in operation. The reason is that the common coverage area $R_{abc}$ is covered by all of the primary base station B1 and the secondary base stations C1 and C2. Moreover, the control apparatus 10 of the environmental control system 1 takes the primary base station B1 as origin when determining the position of the trackable apparatus 15. Therefore, the control apparatus 10 adopts different strategies to decide the time point to switch between the secondary base stations depending on whether the trackable apparatus 15 faces the primary base station B1 (i.e., whether the trackable apparatus 15 has sensed the signal transmitted by the primary base station B1) or not.

The scenario that the trackable apparatus 15 faces the primary base station B1 at least at one certain time point when the trackable apparatus 15 moves in the common area $R_{abc}$ will be illustrated herein.

During the operation of the environmental control system 1, the trackable apparatus 15 senses signals transmitted by the primary base station B1 and the secondary base station C1 or the secondary base station C2 and transmits a set of sensed signals to the control apparatus 10. The control apparatus 10 receives the set of sensed signals transmitted from the trackable apparatus 15 via the receiving interface 11. Here, it is assumed that the receiving interface 11 receives a plurality of sets of first sensed signals from the trackable apparatus 15 within a first time period, wherein each set of first sensed signals is sensed from the primary base station B1 or the secondary base station C1 (which means that the primary base station B1 and the secondary base station C1 are turned on within the first time period), and the last set of first sensed signals is sensed from the primary base station B1 (which means that the trackable apparatus 15 faces the primary base station B1 at the last moment within the first time period).

In this embodiment, if a set of sensed signals is sensed from the primary base station B1, it means that the trackable apparatus 15 faces the primary base station B1 in the sweep cycle corresponding to the set of sensed signals. In other embodiments, only when a set of sensed signals is sensed from the primary base station B1 and the set of sensed signals comprises a plurality of sensed values (e.g., four sensed values) will the trackable apparatus 15 be considered as facing the primary base station B1 in the sweep cycle corresponding to the set of sensed signals. In other words, in these embodiments, the aforementioned last set of first sensed signals is sensed from the primary base station B1 and comprises a plurality of sensed values.

The processor 13 determines that the trackable apparatus 15 has moved at least a first predetermined distance in the common coverage area $R_{abc}$ in a first direction away from the secondary base station C1 and toward the secondary base station C2 within the first time period according to the sets of first sensed signals. It shall be appreciated that how the processor 13 calculates the location of the trackable apparatus 15, determines the moving direction of the trackable apparatus 15, and calculates the distance that the trackable apparatus 15 has moved according to the sets of first sensed signals is not the focus of the present invention and, thus, will not be further described herein. The trackable apparatus 15 having moved at least the first predetermined distance in the common coverage area $R_{abc}$ in the first direction within the first time period means that the trackable apparatus 15 is very likely to continue to move away from the secondary base station C1 and toward the secondary base station C2. Therefore, after the processor 13 determines that the trackable apparatus 15 has moved at least the first predetermined distance in the common coverage area $R_{abc}$ in the first direction within the first time period, the receiving interface 11 transmits a first instruction signal and a second instruction signal to the trackable apparatus 15. The trackable apparatus 15 then transmits the first instruction signal and the second instruction signal respectively to the secondary base station C1 and the secondary base station C2. The secondary base station C1 is turned off in response to the first instruction signal and the secondary base station C2 is turned on in response to the second instruction signal.

In some embodiments, the control apparatus 10 may adopt the strategy of "switching between the secondary base stations as early as possible." The control apparatus 10 will determine whether to switch between the secondary base stations right after the tracking apparatus 15 has entered the common coverage area $R_{abc}$ from the common coverage area $R_{ab}$. In these embodiments, the processor 13 may determine whether the trackable apparatus 15 has just entered the common coverage area $R_{abc}$ from the common coverage area $R_{ab}$ according to other sets of sensed signals received in other time periods that are earlier than the first time period. In these embodiments, the processor 13 determines that the trackable apparatus 15 has moved at least the first predetermined distance in the first direction in the common coverage area $R_{abc}$ within a predetermined time period after determining that the trackable apparatus 15 has entered the common coverage area $R_{abc}$ from the common coverage area $R_{ab}$, and then instructs the secondary base stations in the aforesaid way based on the determination result. Briefly speaking, in these embodiments, once the control apparatus 10 determines that the trackable apparatus 15 has entered the coverage of another secondary base station, the control apparatus 10 determines whether the trackable apparatus 15 continues to move toward the another secondary base station so as to switch the secondary base station in operation as early as possible.

In some embodiments, the control apparatus 10 utilizes a virtual separation line to decide whether to switch between the secondary base stations. In these embodiments, the processor 13 not only determines that the trackable apparatus 15 has moved at least the first predetermined distance in the first direction away from the secondary base station C1 and toward the secondary base station C2 in the common coverage area $R_{abc}$ within the first time period, but also determines whether the trackable apparatus 15 has moved across a virtual separation line more than a second predetermined distance during this process. The processor 13 instructs the secondary base stations to switch in the aforesaid way only after the processor 13 determines that the trackable apparatus 15 has moved at least the first predetermined distance in the common coverage area $R_{abc}$ in the first direction away from the secondary base station C1 and toward the secondary base station C2 within the first time period and has moved across the virtual separation line more than the second predetermined distance.

In some embodiments, the aforesaid virtual separation line may be a middle line between the secondary base station C1 and the secondary base station C2. Specifically, a location where the secondary base station C1 is disposed and a location where the secondary base station C2 is disposed define a midpoint, and the virtual separation line is defined by the midpoint and a location where the primary base station B1 is disposed.

Please note that the above descriptions are based on the example that the trackable apparatus 15 moves in the common coverage area $R_{abc}$ in the direction away from the secondary base station C1 and toward the secondary base station C2. Based on the above descriptions, how the control apparatus 10 determines whether to switch from the secondary base station C2 to the secondary base station C1 and how to instruct them to switch when the trackable apparatus 15 moves in the common coverage area $R_{abc}$ in the direction away from the secondary base station C2 toward the base station C1 shall be appreciated by those of ordinary skill in the art, and thus will not be further described herein.

Please note that the control apparatus 10 determines whether to switch between the secondary base stations based on the same principle/logic for both the case that the tracking apparatus 15 moves in the common coverage area $R_{abc}$ in the direction away from the secondary base station C1 and toward the secondary base station C2 and the case that the tracking apparatus 15 moves in the common coverage area $R_{abc}$ in the direction away from the secondary base station C2 and toward the secondary base station C1. Therefore, in the aforesaid embodiment that utilizes the virtual separation line to decide whether to switch between the secondary base stations, the processor 13 further determine whether the trackable apparatus 15 has moved across the virtual separation line more than the second predetermined distance (i.e., across the virtual separation line by a distance that is far enough) in addition to determining whether the trackable apparatus 15 has moved across the virtual separation line. Because the processor 13 has to determine whether the trackable apparatus 15 has moved across the virtual separation line more than the second predetermined distance, switching between the secondary base stations will not happen frequently even if the trackable apparatus 15 moves back and forth across the virtual separation line continuously.

Next, the scenario that the trackable apparatus 15 does not face the primary base station B1 when the trackable apparatus 15 moves in the common coverage area $R_{abc}$ will be illustrated.

If the switching between the secondary base stations is performed when the trackable apparatus 15 does not face the primary base station B1, coordinate transformation will cause time difference. Therefore, the control apparatus 13 may adopt the strategy of "postponing the switch between the secondary base stations." Before describing the details, two virtual separation lines are defined herein. The first virtual separation line distinguishes the common coverage area $R_{abc}$ from the common coverage area $R_{ac}$, and the second virtual separation line distinguishes the common coverage area $R_{abc}$ from the common coverage area $R_{ab}$.

Herein, it is assumed that the receiving interface 11 receives a plurality of sets of second sensed signals from the trackable apparatus 15 within a second time period, and each set of second sensed signals complies with one of the following two conditions: (1) being sensed from the secondary base station C1 and (2) being sensed from the primary base station B1, and comprising at least one sensed value, and the number of the at least one sensed value is smaller than a predetermined value (e.g., smaller than 4). When either one of the above two conditions is met, it means that the secondary base station C1 is turned on within the second time period and the trackable apparatus 15 does not face the primary base station B1 within the second time period. When the processor 13 determines that the trackable apparatus 15 has moved in the common coverage area $R_{abc}$ in a second direction away from the secondary base station C1 and toward the secondary base station C2 within the second time period according to the sets of second sensed signals, the processor 13 further determines whether the trackable apparatus 15 has moved to a location that is close enough to the first virtual separation line. In other words, the processor 13 decides to switch between the secondary base stations only if the processor 13 determines that the trackable apparatus 15 has moved to a second location in the second direction away from the secondary base station C1 toward the secondary base station C2 in the common coverage area $R_{abc}$ within the second time period according to the plurality of sets of second sensed signals, and the second location has a distance from the first virtual separation line that is less than a threshold. Specifically, the receiving interface 11 transmits a third instruction signal and a fourth instruction signal to the trackable apparatus 15 in response to the aforesaid determination result, and the trackable apparatus 15 then transmits the third instruction signal and the fourth instruction signal respectively to the secondary base station C2 and the secondary base station C1. The secondary base station C2 is turned on in response to the third instruction signal and the secondary base station C1 is turned off in response to the fourth instruction signal.

It shall be appreciated that the above descriptions are based on the example that the trackable apparatus 15 moves in the common coverage area $R_{abc}$ in the direction away from the secondary base station C1 and toward the secondary base station C2. Based on the above descriptions, how the control apparatus 10 determines whether to switch from the secondary base station C2 to the secondary base station C1 and how to instruct them to switch when the trackable apparatus 15 moves in the common coverage area $R_{abc}$ in the direction away from the secondary base station C2 and toward the base station C1 shall be appreciated by those of ordinary skill in the art, and thus will not be further described herein.

According to the above descriptions, when the trackable apparatus 15 moves in the common coverage area $R_{abc}$, the way to determine whether to switch the secondary base station being in operation is decided according to whether the trackable apparatus 15 faces the primary base station B1. Briefly speaking, when the trackable apparatus 15 faces the primary base station B1 at least at one time point, the control apparatus 10 evaluates whether the trackable apparatus 15 becomes closer to a certain secondary base station according to whether the trackable apparatus 15 has moved at least a predetermined distance in a certain direction. When the trackable apparatus 15 has moved at least the predetermined distance in the certain direction, the control apparatus 10 decides to switch between the secondary base stations when the trackable apparatus 15 faces the primary base station B1. When the trackable apparatus 15 moves in the common coverage area $R_{abc}$ without facing the primary base station B1, the strategy of "postponing the switch between the secondary base stations" may be adopted. Because the control apparatus 10 can switch the secondary base station in operation, only one secondary base station operates at any time point. Thus, the positioning and tracking range of the lighthouse tracking technology can be expanded.

Figure 2:
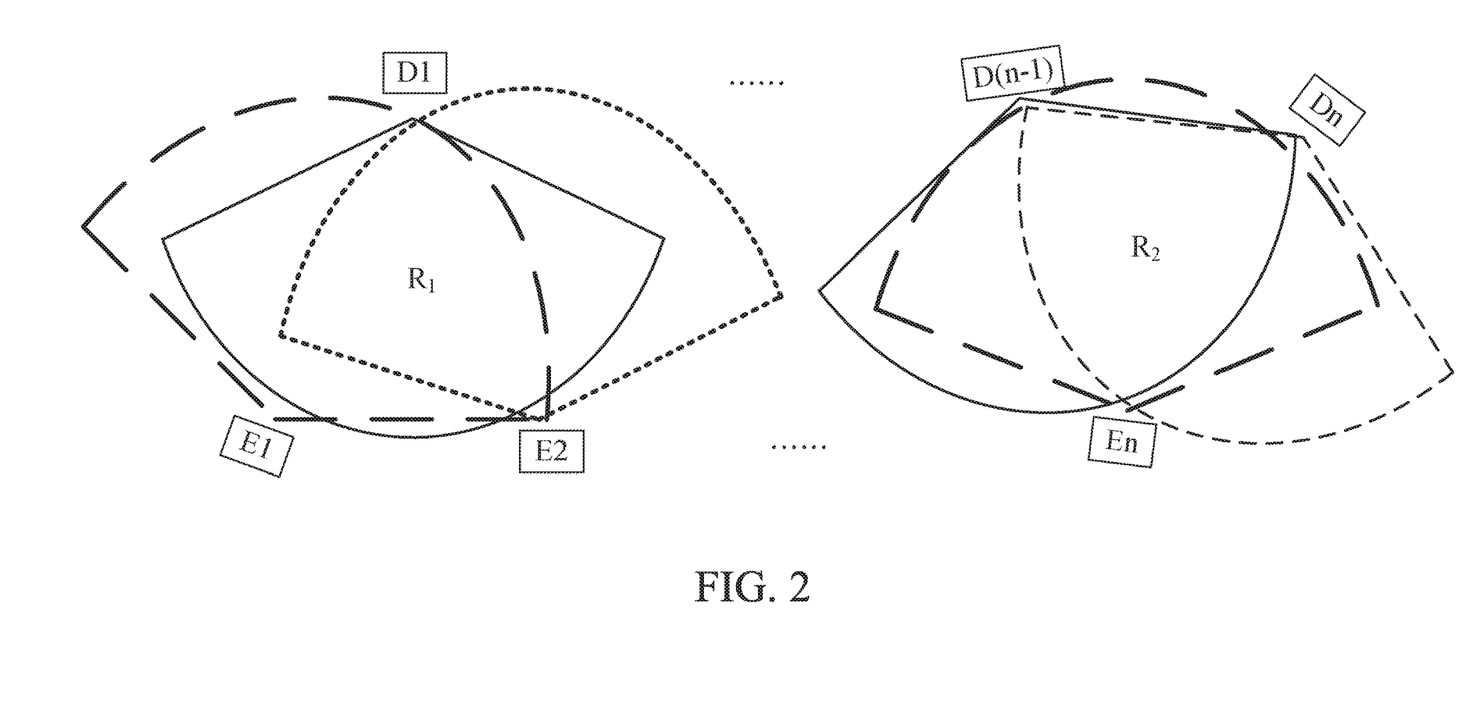
FIG. 2 is a schematic view depicting a second embodiment.

A second embodiment of the present invention is an extended application of the environmental control system 1, which is depicted in FIG. 2. In this embodiment, two sets of base stations are adopted, wherein the first set comprises n base stations D1, . . . , D(n−1), Dn, the second set comprises n base stations E1, E2, . . . , En, and the parameter n is a positive integer greater than 1. The base stations D1, . . . , D(n−1), Dn are disposed at one side of a space, while the base stations E1, E2, . . . , En are disposed at the other side of the space. It shall be appreciated that, in other embodiments, the number of the first set of base stations may be different from the number of the second set of base stations. In addition, the arrangement of the two sets of base stations is not limited to that shown in FIG. 2.

The control apparatus 10 knows the locations where the base stations D1, ..., D(n−1), Dn, E1, E2, ..., En are disposed in the space, knows the coverage of each of these base stations, and knows the common coverage areas between these base stations. For example, the tracking apparatus 15 may learn the aforesaid information in the initialization stage.

In this embodiment, at any time point during the operation of the extended environmental control system, only one of the base stations D1, ..., D(n−1), D(n) is turned on, and only one of the base stations E1, E2, ..., En is turned on. Therefore, when the trackable apparatus 15 moves in the space, the control apparatus 10 needs to consider whether any two adjacent base stations in the first set of base stations D1, D(n−1), D(n) need to switch and whether any two adjacent base stations in the second set of base stations E1, E2, ..., En need to switch.

In this embodiment, when there is a need in switching between the base stations, the two base stations that are going to be switched are regarded as the secondary base stations and the rest base station is regarded as the primary base station. In other words, any base station can play the role of a primary base station and the role of a secondary base station depending on the location of the trackable apparatus 15.

For ease of understanding, an example that the trackable apparatus 15 is located within a common coverage area $R_1$ of the base station D1, the base station E1, and the base station E2 is given herein. In this example, the base station D1 is regarded as the primary base station, while both the base stations E1 and E2 are regarded as the secondary base stations. Regarding how the control apparatus 10 determines whether to switch between the base station E1 and the base station E2, the details are the same as those described in the first embodiment. Thus, the details will not be repeated herein. Herein, another example that the trackable apparatus 15 is located within a common coverage area $R_2$ of the base station D(n−1), the base station Dn, and the base station En is given. In this example, the base station D(n−1) and the base station Dn are regarded as the secondary base stations, while the base station En is regarded as the primary base station. Regarding how the control apparatus 10 determines whether to switch between the base station D(n−1) and the base station Dn, the details are the same as those described in the first embodiment. Thus, the details will not be repeated herein.

From the above descriptions, one can learn that when the extended environmental control system comprises two sets of base stations, the control apparatus 10 considers whether any two adjacent base stations in any set of the base stations need to be switched. Thus, at any time point, only one base station from each set operates. Through the extended application of this embodiment, the problem of a limited working/moving space of adopting the conventional lighthouse tracking technology can be solved and, therefore, the user can move in a larger space.

Figure 3A:
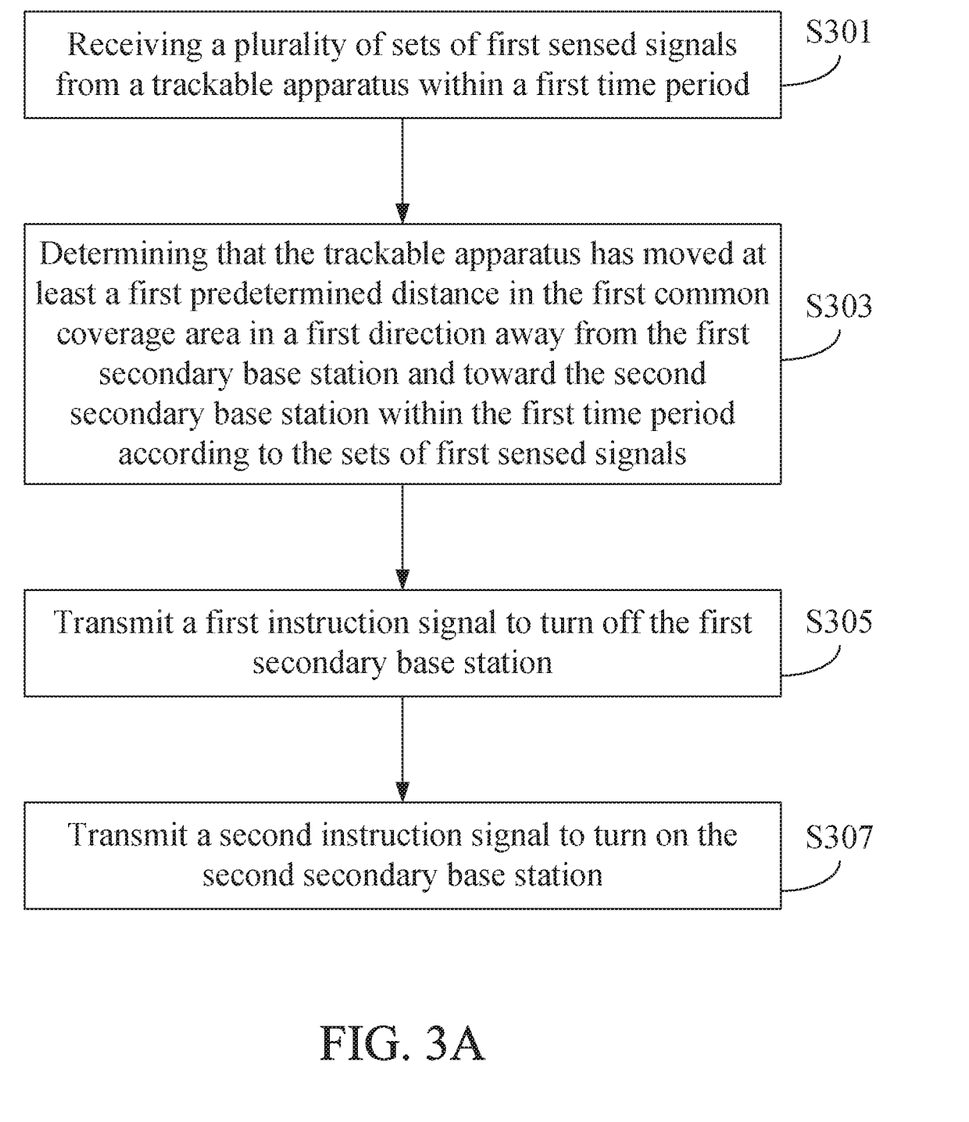
FIG. 3A and FIG. 3B are flowchart depicting a third embodiment.
Figure 3B:
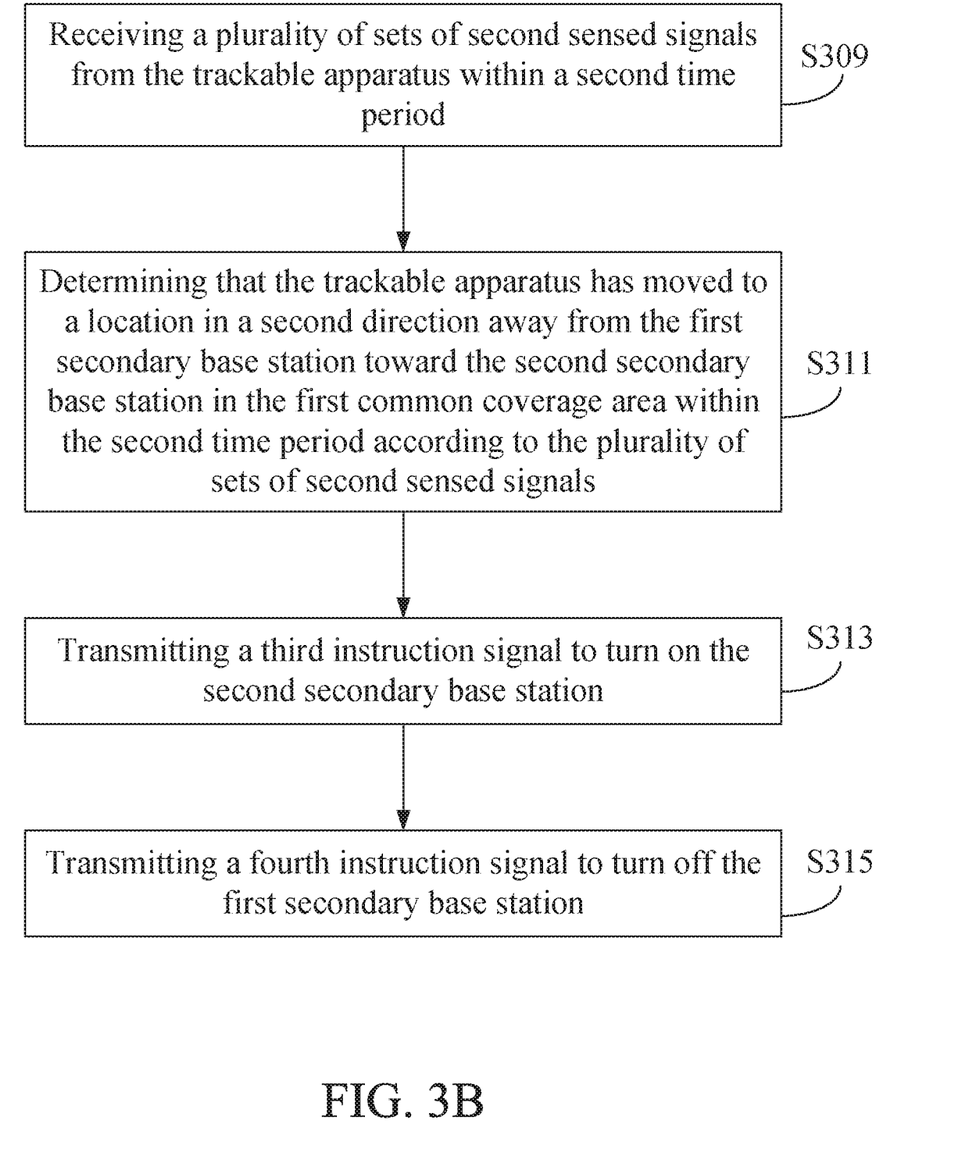

A third embodiment of the present invention is a control method, and flowchart diagrams thereof are depicted in FIG. 3A and FIG. 3B. The control method is adapted for an electronic computing apparatus (e.g., the control apparatus 10 of the first embodiment and the second embodiment) and operates with a system adopting the lighthouse tracking technology. The system comprises a trackable apparatus, a primary base station, a first secondary base station, and a second secondary base station, wherein the primary base station, the first secondary base station, and the second secondary base station have a first common coverage area.

The control method of this embodiment is able to control the switch between the first secondary base station and the second secondary base station. When the trackable apparatus faces the primary base station at least at one time point, the control method decides the switch between the first secondary base station and the second secondary base station based on the process shown in FIG. 3A. When the trackable apparatus does not face the primary base station, the control method decides the switch between the first secondary base station and the second secondary base station based on the process shown in FIG. 3B.

First, please refer to FIG. 3A for the specific process adopted by the control method when the trackable apparatus faces the primary base station at least at one time point. In step S301, the electronic computing apparatus receives a plurality of sets of first sensed signals from a trackable apparatus within a first time period, wherein each set of first sensed signals is sensed from one of a primary base station and a first secondary base station, and the last set of first sensed signals is sensed from the primary base station.

In this embodiment, if a set of sensed signals is sensed from the primary base station, it means that the trackable apparatus faces the primary base station in the sweep cycle corresponding to the set of sensed signals. In other embodiments, only when a set of sensed signals is sensed from the primary base station and the set of sensed signals comprises a plurality of sensed values (e.g., four sensed values) will the trackable apparatus be considered as facing the primary base station in the sweep cycle corresponding to the set of sensed signals. In other words, in those embodiments, the last set of first sensed signals is sensed from the primary base station and comprises a plurality of sensed values.

In step S303, the electronic computing apparatus determines that the trackable apparatus has moved at least a first predetermined distance in the first common coverage area in a first direction away from the first secondary base station and toward the second secondary base station within the first time period according to the sets of first sensed signals. In response to the determination result of the step S303, the electronic computing apparatus executes step S305 to transmit a first instruction signal to turn off the first secondary base station. In response to the determination result of the step S303, the electronic computing apparatus executes step S307 to transmit a second instruction signal to turn on the second secondary base station. It shall be appreciated that the order that the step S305 and the step S307 are executed is not limited in the present invention as long as the two steps are executed in response to the determination result of the step S303.

In some embodiments, the control method may adopt the strategy of "switching between the secondary base stations as early as possible." In these embodiments, the electronic computing apparatus executes the step S303 after determining that the trackable apparatus enters the first common coverage area from a second common coverage area that is covered by only the primary base station and the first secondary base station, and then the electronic computing apparatus executes the steps S305 and S307.

In some embodiments, the control method decides whether to switch between the secondary base stations by utilizing a virtual separation line. For example, the virtual separation line may be a middle line of the first secondary base station and the second secondary base station (i.e., a location where the first secondary base station is disposed and a location where the second secondary base station is disposed define a midpoint, and the virtual separation line is defined by the midpoint and a location where the primary base station is disposed). In these embodiments, the step S303 further determines whether the trackable apparatus has moved across the virtual separation line more than a second predetermined distance when the trackable apparatus moves at least the first predetermined distance in the first direction away from the first secondary base station and toward the second secondary base station in the first common coverage area within the first time period. If the trackable apparatus has moved across the virtual separation line more than the second predetermined distance, the step S305 and the step S307 are executed.

Next, please refer to FIG. 3B for the specific process adopted by the control method when the trackable apparatus does not face the primary base station. In step S309, the electronic computing apparatus receives a plurality of sets of second sensed signals from the trackable apparatus within a second time period, wherein each set of second sensed signals complies with one of the following two conditions: (1) being sensed from the first secondary base station and (2) being sensed from the primary base station, comprising at least one sensed value, and the number of the at least one sensed value is smaller than a predetermined value (e.g., 4).

In step S311, the electronic computing apparatus determines that the trackable apparatus has moved to a location in a second direction away from the first secondary base station and toward the second secondary base station in the first common coverage area within the second time period according to the sets of second sensed signals, and a distance from the location to the virtual separation line is less than a threshold. Please note that the virtual separation line is between a second common coverage area covered only by the primary base station and the second secondary base station and the first common coverage area.

In response to the determination result of the step S311, the electronic computing apparatus executes step S313 to transmit a third instruction signal to turn on the second secondary base station. In response to the determination result of the step S311, the electronic computing apparatus executes step S315 to transmit a fourth instruction signal to turn off the first secondary base station. It shall be appreciated that the order that the step S313 and the step S315 are executed is not limited in the present invention as long as the two steps are executed in response to the determination result of the step S311.

Please note that the aforesaid process shown in FIG. 3B is for the scenario that the trackable apparatus does not face the primary base station, and the trackable apparatus moves in the second direction away from the first secondary base station and toward the second secondary base station in the first common coverage area within the second time period. Based on the description related to FIG. 3B, how the control process determines whether to switch between the secondary base stations when the trackable apparatus does not face the primary base station and the trackable apparatus moves in another direction away from the second secondary base station and toward the first secondary base station in the first common coverage area within a certain time period shall be appreciated by those of ordinary skill in the art. Thus, the details will not be further described herein.

In addition to the aforesaid steps, the third embodiment can also execute all the operations and steps set forth in the first and second embodiments, have the same functions, and deliver the same technical effects as the first and second embodiments. How the third embodiment executes these operations and steps, has the same functions, and delivers the same technical effects as the first and second embodiments will be readily appreciated by those of ordinary skill in the art based on the explanation of the first and second embodiments, and thus will not be further described herein.

It shall be appreciated that, in the specification of the present invention, terms "first" and "second" used in the first secondary base station and the second secondary base station are only used to mean that these secondary base stations are different secondary base stations. The terms "first" and "second" used in the first common coverage area and the second common coverage area are only used to mean that these coverage areas are different coverage areas. The terms "first" and "second" used in the first time period and the second time period are only used to mean that these time periods are different time periods. Terms "first," "second," "third," and "fourth" used in the first instruction signal, the second instruction signal, the third instruction signal, and the fourth instruction signal are only used to mean that these instruction signals are different instruction signals.

According to the above descriptions, the control technology (including the environmental control system, the control apparatus, and the control method thereof) provided by the present invention is used for the lighthouse tracking technology and decides whether to switch the secondary base station in operation according to which common coverage area that the trackable apparatus is in and according to whether the trackable apparatus faces the primary base station. Through the control technology provided by the present invention, only one primary base station and one secondary base station operate at any time point, so the problem of a limited working/moving space in the conventional lighthouse tracking technology can be solved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

The invention claimed is:
1. A control apparatus, comprising:
a receiving interface, being configured to receive a plurality of sets of first sensed signals from a trackable apparatus within a first time period, wherein each set of first sensed signals is sensed from one of a primary base station and a first secondary base station, the last set of first sensed signals is sensed from the primary base station, and the primary base station, the first secondary base station, and a second secondary base station have a first common coverage area; and
a processor, being electrically connected to the receiving interface and configured to determine that the trackable apparatus has moved at least a first predetermined distance in the first common coverage area in a first direction away from the first secondary base station and toward the second secondary base station within the first time period according to the sets of first sensed signals,
wherein after the processor determines that the trackable apparatus has moved at least the first predetermined distance in the first common coverage area in the first direction within the first time period, the receiving interface further transmits a first instruction signal to turn off the first secondary base station and transmits a second instruction signal to turn on the second secondary base station.

2. The control apparatus of claim 1, wherein the last set of first sensed signals comprises a plurality of sensed values.

3. The control apparatus of claim 1, wherein the processor further determines that the trackable apparatus enters the first common coverage area from a second common coverage area that is covered by only the primary base station and the first secondary base station, and wherein the processor determines that the trackable apparatus has moved at least the first predetermined distance within a predetermined time period after determining that the trackable apparatus enters the first common coverage area from the second common coverage area.

4. The control apparatus of claim 1, wherein the processor further determines that the trackable apparatus has moved across a virtual separation line more than a second predetermined distance when the trackable apparatus moves at least the first predetermined distance in the first direction, and wherein the receiving interface transmits the first instruction signal and the second instruction signal after the processor determines that the trackable apparatus has moved at least the first predetermined distance in the first common coverage area in the first direction within the first time period and has moved across the virtual separation line more than the second predetermined distance.

5. The control apparatus of claim 4, wherein a location of the first secondary base station and a location of the second secondary base station define a midpoint, and the virtual separation line is defined by the midpoint and a location of the primary base station.

6. The control apparatus of claim 1, wherein a virtual separation line is between the first common coverage area and a second common coverage area covered by only the primary base station and the second secondary base station, and the receiving interface further receives a plurality of sets of second sensed signals from the trackable apparatus within a second time period,
wherein each set of second sensed signals complies with one of the following two conditions: (1) being sensed from the first secondary base station and (2) being sensed from the primary base station and comprising at least one sensed value, and a number of the at least one sensed value is smaller than a predetermined value, and
wherein the processor further determines that the trackable apparatus has moved to a location along a second direction in the first common coverage area within the second time period according to the sets of second sensed signals, the second direction is away from the first secondary base station and toward the second secondary base station, a distance from the location to the virtual separation line is smaller than a threshold, and the receiving interface further transmits a third instruction signal to turn on the second secondary base station and transmits a fourth instruction signal to turn off the first secondary base station after the processor determines that the trackable apparatus has moved to the location.

7. The control apparatus of claim 1, wherein a virtual separation line is between the first common coverage and a second common coverage area covered by only the primary base station and the first secondary base station, and the receiving interface further receives a plurality of sets of second sensed signals from the trackable apparatus within a second time period,
wherein each set of second sensed signals complies with one of the following two conditions: (1) being sensed from the second secondary base station and (2) being sensed from the primary base station and comprising at least one sensed value, and a number of the at least one sensed value is smaller than a predetermined value, and
wherein the processor further determines that the trackable apparatus has moved to a location along a second direction in the first common coverage area within the second time period according to the sets of second sensed signals, the second direction is away from the second secondary base station and toward the first secondary base station, a distance from the location to the virtual separation line is smaller than a threshold, and the receiving interface further transmits a third instruction signal to turn on the first secondary base station and transmits a fourth instruction signal to turn off the second secondary base station after the processor determines that the trackable apparatus has moved to the location.

8. A control method, being adapted for an electronic computing apparatus, the control method comprising the following steps of:
(a) receiving a plurality of sets of first sensed signals from a trackable apparatus within a first time period, wherein each set of first sensed signals is sensed from one of a primary base station and a first secondary base station, the last set of first sensed signals is sensed from the primary base station, and the primary base station, the first secondary base station, and a second secondary base station have a first common coverage area;
(b) determining that the trackable apparatus has moved at least a first predetermined distance in the first common coverage area in a first direction that is away from the first secondary base station toward the second secondary base station within the first time period according to the plurality of sets of first sensed signals;
(c) transmitting a first instruction signal to turn off the first secondary base station after determining that the trackable apparatus has moved at least the first predetermined distance in the first common coverage area in the first direction within the first time period; and
(d) transmitting a second instruction signal to turn on the second secondary base station after determining that the trackable apparatus has moved at least the first predetermined distance in the first common coverage area in the first direction within the first time period.

9. The control method of claim 8, wherein the last set of first sensed signals comprises a plurality of sensed values.

10. The control method of claim 8, further comprising the following step of:
(e) determining that the trackable apparatus enters the first common coverage area from a second common coverage area that is covered by only the primary base station and the first secondary base station;
wherein the step (b) is performed within a predetermined time period after the step (e) determines that the trackable apparatus enters the first common coverage area from the second common coverage area.

11. The control method of claim 8, further comprising the following step of:
(e) determining that the trackable apparatus has moved across a virtual separation line more than a second predetermined distance when the trackable apparatus moves at least the first predetermined distance in the first direction;
wherein the step (c) and the step (d) are performed after the step (e).

12. The control method of claim 11, wherein a location of the first secondary base station and a location of the second secondary base station define a midpoint, and the virtual separation line is defined by the midpoint and a location of the primary base station.

13. The control method of claim 8, wherein a virtual separation line is between the first common coverage area and a second common coverage area covered by only the primary base station and the second secondary base station, the control method further comprises the following steps of:
receiving a plurality of sets of second sensed signals from the trackable apparatus within a second time period, wherein each set of second sensed signals complies with one of the following two conditions: (1) being sensed from the first secondary base station and (2) being sensed from the primary base station and comprising at least one sensed value, and a number of the at least one sensed value is smaller than a predetermined value,
determining that the trackable apparatus has moved to a location along a second direction in the first common coverage area within the second time period according to the plurality of sets of second sensed signals, the second direction is away from the first secondary base station and toward the second secondary base station, a distance from the location to the virtual separation line is smaller than a threshold;
transmitting a third instruction signal to turn on the second secondary base station after determining that the trackable apparatus has moved to the location; and
transmitting a fourth instruction signal to turn off the first secondary base station after determining that the trackable apparatus has moved to the location.

14. The control method of claim 8, wherein a virtual separation line is between the first common coverage area and a second common coverage area covered by only the primary base station and the first secondary base station, the control method further comprises the following steps of:
receiving a plurality of sets of second sensed signals from the trackable apparatus within a second time period, wherein each set of second sensed signals complies with one of the following two conditions: (1) being sensed from the second secondary base station and (2) being sensed from the primary base station and comprising at least one sensed value, and a number of the at least one sensed value is smaller than a predetermined value,
determining that the trackable apparatus has moved to a location along a second direction in the first common coverage area within the second time period according to the plurality of sets of second sensed signals, the second direction is away from the second secondary base station and toward the first secondary base station, a distance from the location to the virtual separation line is smaller than a threshold;
transmitting a third instruction signal to turn on the first secondary base station after determining that the trackable apparatus has moved to the location; and
transmitting a fourth instruction signal to turn off the second secondary base station after determining that the trackable apparatus has moved to the location.

15. An environmental control system, comprising:
a primary base station;
a first secondary base station;
a second secondary base station, wherein the primary base station, the first secondary base station, and the second secondary base station have a first common coverage area;
a trackable apparatus, being configured to sense at least one signal transmitted by the primary base station, the first secondary base station, and the second secondary base station; and
a control apparatus, receiving a plurality of sets of first sensed signals from the trackable apparatus within a first time period, wherein each set of first sensed signals is sensed from one of the primary base station and the first secondary base station, and the last set of first sensed signals is sensed from the primary base station,
wherein the control apparatus further determines that the trackable apparatus has moved at least a first predetermined distance in the first common coverage area in a first direction away from the first secondary base station toward the second secondary base station within the first time period according to the plurality of sets of first sensed signals, and
wherein after the control apparatus determines that the trackable apparatus has moved at least the first predetermined distance in the first common coverage area in the first direction within the first time period, the control apparatus transmits a first instruction signal and a second instruction signal to the trackable apparatus, the trackable apparatus transmits the first instruction signal and the second instruction signal to the first secondary base station and the second secondary base station respectively, the first secondary base station is turned off in response to the first instruction signal, and the second secondary base station is turned on in response to the second instruction signal.

16. The environmental control system of claim 15, wherein the last set of the first sensed signals comprises a plurality of sensed values.

17. The environmental control system of claim 15, wherein the control apparatus further determines that the trackable apparatus enters the first common coverage area from a second common coverage area that is covered by only the primary base station and the first secondary base station, and wherein the control apparatus determines that the trackable apparatus has moved at least the first predetermined distance within a predetermined time period after determining that the trackable apparatus enters the first common coverage area from the second common coverage area.

18. The environmental control system of claim 15, wherein the control apparatus further determines that the trackable apparatus has moved across a virtual separation line more than a second predetermined distance when the trackable apparatus moves at least the first predetermined distance in the first direction, and wherein the control apparatus transmits the first instruction signal and the second instruction signal after determining that the trackable apparatus has moved at least the first predetermined distance in the first common coverage area in the first direction within the first time period and has moved across the virtual separation line more than the second predetermined distance.

19. The environmental control system of claim 18, wherein a location of the first secondary base station and a location of the second secondary base station define a midpoint, and the virtual separation line is defined by the midpoint and a location of the primary base.

20. The environmental control system of claim 15, wherein a virtual separation line is between the first common coverage area and a second common coverage area covered by only the primary base station and the second secondary base station, and the control apparatus receives a plurality of sets of second sensed signals from the trackable apparatus within a second time period,
- wherein each set of second sensed signals complies with one of the following two conditions: (1) being sensed from the first secondary base station and (2) being sensed from the primary base station and comprising at least one sensed value, and a number of the at least one sensed value is smaller than a predetermined value,
- wherein the control apparatus further determines that the trackable apparatus has moved to a location along a second direction in the first common coverage area within the second time period according to the sets of second sensed signals, the second direction is away from the first secondary base station and toward the second secondary base station, a distance from the location to the virtual separation line is smaller than a threshold, the control apparatus further transmits a third instruction signal and a fourth instruction signal to the trackable apparatus after the control apparatus determines that the trackable apparatus has moved to the location, the trackable apparatus transmits the third instruction signal and the fourth instruction signal to the second secondary base station and the first secondary base station respectively, the second secondary base station is turned on in response to the third instruction signal, and the first secondary base station is turned off in response to the fourth instruction signal.

21. The environmental control system of claim 15, wherein a virtual separation line is between the first common coverage area and a second common coverage area covered by only the primary base station and the first secondary base station, and the control apparatus further receives a plurality of sets of second sensed signals from the trackable apparatus within a second time period,
- wherein each set of second sensed signals complies with one of the following two conditions: (1) being sensed from the second secondary base station and (2) being sensed from the primary base station and comprising at least one sensed value, and a number of the at least one sensed value is smaller than a predetermined value, and
- wherein the control apparatus further determines that the trackable apparatus has moved to a location along a second direction in the first common coverage area within the second time period according to the sets of second sensed signals, the second direction is away from the first secondary base station and toward the second secondary base station, a distance from the location to the virtual separation line that is smaller than a threshold, the control apparatus further transmits a third instruction signal and a fourth instruction signal to the trackable apparatus after the control apparatus determines that the trackable apparatus has moved to the location, the trackable apparatus transmits the third instruction signal and the fourth instruction signal to the first secondary base station and the second secondary base station respectively, the first secondary base station is turned on in response to the third instruction signal, and the second secondary base station is turned off in response to the fourth instruction signal.

* * * * *